US012598172B2

(12) United States Patent
Tammana et al.

(10) Patent No.: US 12,598,172 B2
(45) Date of Patent: Apr. 7, 2026

(54) IDENTITY SHARDED CACHE FOR THE DATA PLANE DATA

(71) Applicant: Oracle International Corporation, Redwood Shores, CA (US)

(72) Inventors: Venkata Rama Prasad Tammana, Redmond, WA (US); Kedar Nitin Mishra, Sammamish, WA (US); Matthew Hoover, Seattle, WA (US); Girish Nagaraja, Sammamish, WA (US); Arsalan Ahmad, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 196 days.

(21) Appl. No.: 17/956,227

(22) Filed: Sep. 29, 2022

(65) Prior Publication Data

US 2023/0101303 A1     Mar. 30, 2023

Related U.S. Application Data

(60) Provisional application No. 63/251,010, filed on Sep. 30, 2021.

(51) Int. Cl.
*H04L 9/40*          (2022.01)
*G06F 16/27*         (2019.01)
*G06F 3/06*          (2006.01)

(52) U.S. Cl.
CPC ........ *H04L 63/0815* (2013.01); *H04L 63/104* (2013.01); *G06F 3/067* (2013.01); *G06F 16/278* (2019.01)

(58) Field of Classification Search
CPC ... H04L 63/0815; H04L 63/104; G06F 3/067; G06F 16/278
See application file for complete search history.

(56) References Cited

U.S. PATENT DOCUMENTS

| | | | |
|---|---|---|---|
| 9,189,644 B2 | 11/2015 | Kling et al. | |
| 9,489,390 B2 | 11/2016 | Kling et al. | |
| 9,774,586 B1 | 9/2017 | Roche et al. | |
| 9,781,122 B1 | 10/2017 | Wilson et al. | |
| 9,838,376 B1 | 12/2017 | Lander et al. | |

(Continued)

OTHER PUBLICATIONS

"AWS Identity and Access Management (IAM)", Available Online at: https://aws.amazon.com/iam/, 2021, 1 page.

(Continued)

*Primary Examiner* — William R Korzuch
*Assistant Examiner* — Aditya Sriram
(74) *Attorney, Agent, or Firm* — Kilpatrick Townsend & Stockton LLP

(57)          ABSTRACT

In some aspects, an authentication service may divide authentication data into one or more data stripes, the authentication data including at least one of: user identifier (userID); group identifier (groupID); group membership; client identifier (clientID); dynamic group (DG) membership; or dynamic group identifier. The authentication service may store the one or more data stripes in one or more databases, the databases being contained in a host machine of a fleet, where the fleet contains one or more host machines. The authentication service may update the databases from the data stripe via a background thread. Numerous other aspects are described.

20 Claims, 12 Drawing Sheets

(56) References Cited

U.S. PATENT DOCUMENTS

| | | | | |
|---|---|---|---|---|
| 9,935,934 | B1* | 4/2018 | Orozco | H04L 9/3213 |
| 9,940,474 | B1 | 4/2018 | Franklin et al. | |
| 10,255,061 | B2 | 4/2019 | Lander et al. | |
| 10,341,410 | B2 | 7/2019 | Lander et al. | |
| 10,425,386 | B2 | 9/2019 | Wardell et al. | |
| 10,454,940 | B2 | 10/2019 | Lander et al. | |
| 10,484,243 | B2 | 11/2019 | Cole et al. | |
| 10,484,382 | B2 | 11/2019 | Wilson et al. | |
| 10,511,589 | B2 | 12/2019 | Gangawane et al. | |
| 10,511,593 | B2 | 12/2019 | Appiah et al. | |
| 10,594,684 | B2 | 3/2020 | Bansal et al. | |
| 10,616,224 | B2 | 4/2020 | Subramanian et al. | |
| 10,715,564 | B2 | 7/2020 | Mohamad Abdul et al. | |
| 10,798,165 | B2 | 10/2020 | Srinivasan et al. | |
| 10,846,390 | B2 | 11/2020 | Subramanian et al. | |
| 10,878,079 | B2 | 12/2020 | Vepa et al. | |
| 10,931,656 | B2 | 2/2021 | Carru et al. | |
| 10,999,370 | B1 | 5/2021 | Schwartz | |
| 11,061,929 | B2 | 7/2021 | Xu et al. | |
| 11,165,634 | B2 | 11/2021 | Medam et al. | |
| 11,308,132 | B2 | 4/2022 | Srinivasan et al. | |
| 11,321,343 | B2 | 5/2022 | Srinivasan et al. | |
| 2005/0187977 | A1* | 8/2005 | Frost | G06F 16/24532 |
| 2016/0267132 | A1* | 9/2016 | Castellanos | G06F 16/172 |
| 2020/0007541 | A1 | 1/2020 | Appiah et al. | |
| 2020/0007555 | A1 | 1/2020 | Jadhav et al. | |
| 2020/0264860 | A1 | 8/2020 | Srinivasan et al. | |
| 2020/0293532 | A1* | 9/2020 | Uzar | G06F 16/24542 |
| 2021/0081252 | A1 | 3/2021 | Bhargava et al. | |
| 2021/0084031 | A1 | 3/2021 | Lao et al. | |
| 2022/0038450 | A1* | 2/2022 | Han | H04L 63/101 |

OTHER PUBLICATIONS

"Cloud SQL IAM Database Authentication", Available Online at: https://cloud.google.com/sql/docs/mysql/authentication, Accessed from Internet on Sep. 14, 2021, pp. 1-4.

"Configuring a Snowflake Storage Integration to Access Amazon S3", Available Online at: https://docs.snowflake.com/en/user-guide/data-load-s3-config-storage-integration.html, Accessed from Internet on Sep. 14, 2021, pp. 1-13.

"Configuring AWS IAM User Credentials to Access Amazon S3", Available Online at: https://docs.snowflake.com/en/user-guide/data-load-s3-config-aws-iam-user.html, Accessed from Internet on Sep. 14, 2021, pp. 1-6.

"Configuring Secure Access to Amazon S3", Available Online at: https://docs.snowflake.com/en/user-guide/data-load-s3-config.html, Accessed from Internet on Sep. 14, 2021, pp. 1-2.

"Data Protection in AWS Identity and Access Management", Available Online at https://docs.aws.amazon.com/IAM/latest/UserGuide/data-protection.html, 2021, 1 page.

"Identity and Access Management (IAM) on IBM Cloud", Available Online at: https://www.ibm.com/docs/en/db2woc?topic=management-identity-access-iam-cloud, 2019, 2 pages.

"Identity Data Storage for European Customers in Azure Active Directory", Available Online at: https://docs.microsoft.com/en-us/azure/active-directory/fundamentals/active-directory-data-storage-eu, Sep. 15, 2020, 2 pages.

"Managing IAM Access, API Keys, Trusted Profiles, Service IDs, and Access Groups (ibmcloud iam)", Available Online at: https://cloud.ibm.com/docs/cli?topic=cli-ibmcloud_commands_iam, Aug. 30, 2021, 84 pages.

"Personal Data Protection Mechanism", Available Online at: https://support.huaweicloud.com/intl/en-us/productdesc-iam/iam_01_0035.html, Mar. 5, 2021, 2 pages.

"Serverless Application Lens", Available Online at: https://d1.awsstatic.com/whitepapers/architecture/AWS-Serverless-Applications-Lens.pdf, Dec. 2019, 82 pages.

"The Role of Identity Access Management (IAM) in Cloud Security", Available Online at: https://www.neovasolutions.com/2020/04/23/the-role-of-identity-access-managementiam-in-cloud-security/, Apr. 23, 2020, 5 pages.

"What is Azure Active Directory?", Available Online at: https://docs.microsoft.com/en-us/azure/active-directory/fundamentals/active-directory-whatis, Jun. 5, 2020, 2 pages.

"Zitadel is Building an IAM-as-a-Service Platform with CockroachDB & CQRS: Building Better Audit Trails with CQRS and CockroachDB", Available Online at: https://resources.cockroachlabs.com/case-study/zitadel, 2021, 2 pages.

Loeser , "Increase Information Security for Db2 on IBM Cloud", Available Online at: https://www.ibm.com/cloud/blog/increase-information-security-for-db2-on-IBM-cloud, Apr. 22, 2020, 2 pages.

Moghadam , "Solving API Authorization Challenges in Multi-Cloud Environments", Available Online at: https://konghq.com/blog/api-authorization, Sep. 9, 2021, 22 pages.

U.S. Appl. No. 17/952,957, Non-Final Office Action, mailed on Feb. 13, 2025, 7 pages.

* cited by examiner

Dividing
authentication data
into data stripes 710

Storing the data
stripes in databases
of a host machine 720

Updating the
databases from the
data stripe via a
background thread
730

IDENTITY SHARDED CACHE FOR THE DATA PLANE DATA

CROSS-REFERENCE TO RELATED APPLICATIONS

This application is a non-provisional of and claims the benefit and priority under 35 U.S.C. 119(e) of U.S. Provisional Application No. 63/251,010, filed on Sep. 30, 2021, entitled "IDENTITY SHARDED CACHE FOR THE DATA PLANE DATA," which is incorporated by reference herein in its entirety for all purposes. Additional material can be found in U.S. patent application Ser. No. 17/952,957, filed on Sep. 26, 2022, entitled "REVERSE LOOKUP OF A USER ID TO A DOMAIN ID ACROSS SHARDS" which claims the benefit and priority under 35 U.S.C. 119 (e) of U.S. Provisional Application No. 63/251,013, filed on Sep. 30, 2021, entitled "REVERSE LOOKUP OF A USER ID TO A DOMAIN ID ACROSS SHARDS" which are incorporated herein by reference in their entirety.

BACKGROUND

Techniques exist for two separate authentication services for cloud services including an attribute based access control (ABAC) using policies and a role based access control (RBAC) using a set of permissions. Techniques are provided for integrating the two authentication services into a single scalable authentication service.

BRIEF SUMMARY

Techniques are provided for a system for storing sharded authentication information.

In one embodiment, the system includes one or more fleets. The one or more fleets can contain one or more host machines that contain one or more databases. The system can include one or more data stripes containing authentication data. The authentication data can include at least one of: a user identifier (userID), a group identifier (groupID), group membership, a client identifier (clientID), dynamic group (DG) membership, or dynamic group identifiers. The authentication data from a stripe can be stored in one or more databases. The system can include one or more background threads. The databases can be backfilled with authentication data from the one or more stripes via background threads. Other embodiments of this aspect include corresponding computer systems, apparatus, and computer programs recorded on one or more computer storage devices, each configured to perform the actions of the methods.

One general aspect includes a computer-implemented method. The method includes an authentication service dividing authentication data into one or more data stripes. The data stripes including at least one of: a user identifier (userID), a group identifier (groupID), group membership, a client identifier (clientID), dynamic group (DG) membership, dynamic group identifiers. The method includes an authentication service storing the one or more data stripes in one or more databases where the databases are contained in a host machine. The host machine being part of a fleet containing one or more host machines. The method also includes the authentication service updating the databases with information from the data stripe via a background thread. Other embodiments of this aspect include corresponding computer systems, apparatus, and computer programs recorded on one or more computer storage devices, each configured to perform the actions of the methods.

In one embodiment, the authentication data from a single stripe is stored in a single host machine.

In one embodiment, the authentication data from a single stripe of the one or more data stripes is stored in one or more databases in a single host machine.

In one embodiment, the one or more host machines in a fleet contain identical authentication data.

One general aspect includes a non-transitory computer-readable medium storing a set of instructions. The instructions, when executed by one or more processors of an authentication service can cause the authentication service to: divide authentication data into one or more data stripes. The authentication data can include at least one of: a user identifier (userID), a group identifier (groupID), group membership, a client identifier (clientID), dynamic group (DG) membership, or a dynamic group identifier. The instructions can cause the authentication service to store the one or more data stripes in one or more databases. The databases can be contained in a host machine of a fleet and a fleet can contain one or more host machines. The instructions can cause the authentication service to update the databases from the data stripe via a background thread.

One general aspect includes an authentication service with one or more memories and one or more processors communicably coupled to the one or more memories. The processors are configured to divide authentication data into one or more data stripes. The authentication data can include at least one of: a user identifier (userID), a group identifier (groupID), group membership, a client identifier (clientID), dynamic group (DG) membership, or a dynamic group identifier. The processors are configured to store one or more data stripes in one or more databases. The databases can be contained in a host machine of a fleet and a fleet can contain one or more host machines. The processors are configured to update the databases from the data stripe via a background thread.

DETAILED DESCRIPTION

Figure 1:
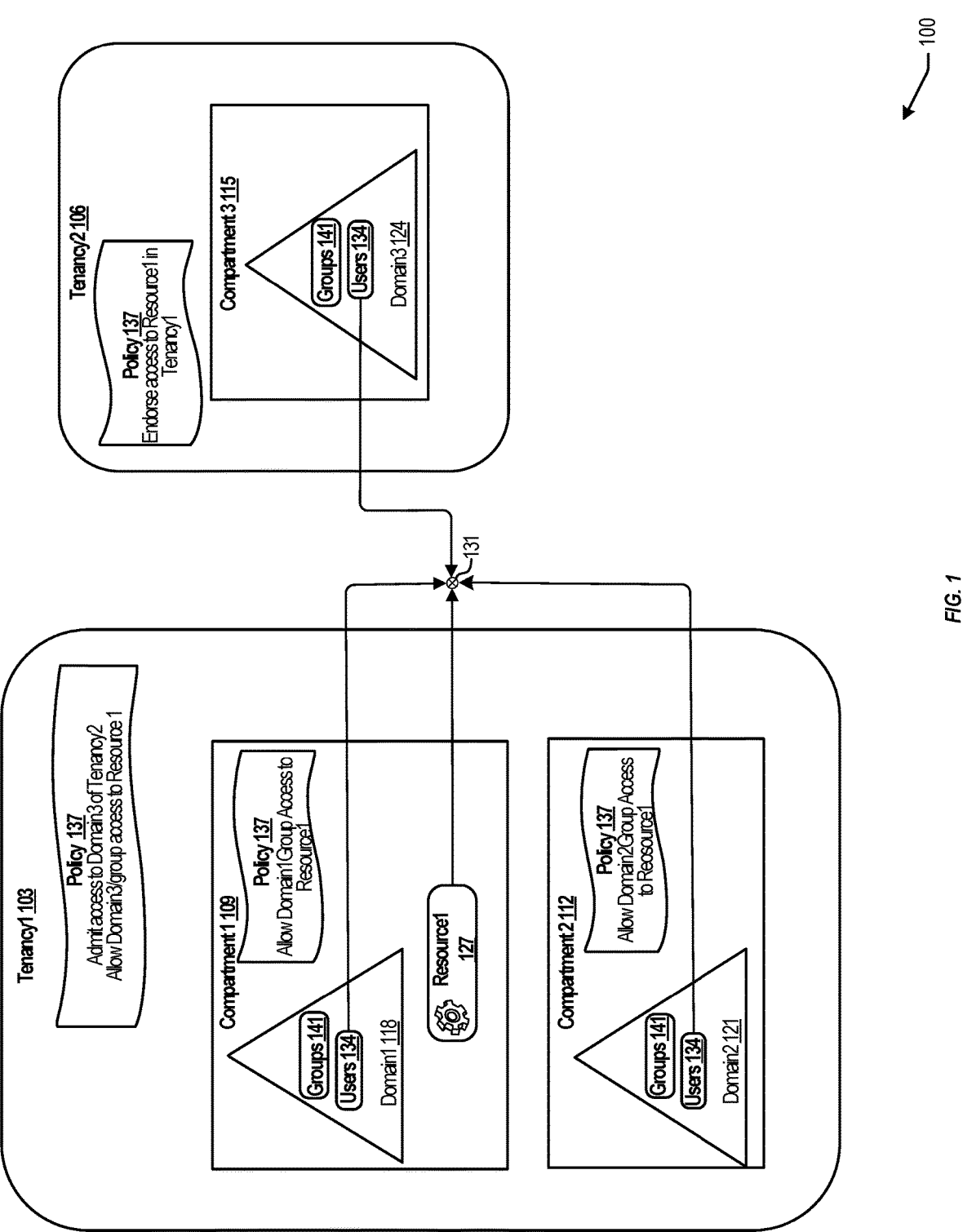
FIG. 1 shows a simplified diagram of an attribute-based access control (ABAC) system using policies according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) may provide multiple cloud services to subscribing customers. These services may be provided under different models including a Software-as-a-Service (SaaS), Platform-as-a-Service (PaaS), an Infra-structure-as-a-Service (IaaS) model, and others.

In the cloud environment, an identity management system is generally provided by the CSP to control user access to resources provided or used by a cloud service. Typical services or functions provided by an identity management system include, without restriction, single sign-on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more two separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login, password, etc. The same customer thus has two separate sets of credentials for the two accounts. This results in an unsatisfactory customer experience. Additionally, having two separate identity management system also creates obstacles for interactions between SaaS/PaaS and IaaS services.

For purposes of this application, and as an example, the two platforms are referred to as IAM and IDCS. These names and terms are however not intended to be limiting in any manner. The teachings of this disclosure apply to any situation where two (or more) different identity management systems are to be integrated. The identity management systems or platforms to be integrated may be provided by one or more CSPs.

In certain embodiments, an integrated identity management platform (referred to as Integrated Identity Management System (IIMS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration however is technically very difficult for several reasons. The two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that don't have "approved" characteristics as defined by an organization's security policies. On the other hand IDCS may be a role-based access control (RBAC) system which is a policy-neutral access-control mechanism defined around roles and privileges. The components of RBAC such as role-permissions, user-role and role-role relationships make it simple to perform user assignments. As yet another reason, the authentication and authorization frameworks or workflows (e.g., types of tokens that are used, different authentication frameworks such as OAUTH, etc.) used by the two platforms may be different. This is just a small sampling of reasons why providing an integrated solution is technically very difficult.

The present idea is directed to a method to unify two types of CI accounts: identity cloud service stripes (IDCS stripes) and identity and access management tenancies (IAM tenancies). The IDCS stripes are part of a RBAC system and the IAM tenancies are part of a ABAC system as discussed above. In order to integrate the IDCS stripes and IAM tenancies, the identity data plane (IDDP) can, in some implementations, authenticate and authorize IDCS service principals using authentication information from the RBAC and ABAC systems.

An obstacle to integration is that, after IIMS, the number of users and groups hosted in IAM regions can increase dramatically. Currently, IAM has 500 thousand users in 1 million groups in one of the larger regions. Each IAM region, after IIMS, can support up to 250 million users in 50 million groups according to certain embodiments. In some implementations, users can be able to join 20 groups with a region containing up to 5 billion group memberships. In some implementations, the proposed changes should not cause regressions to current user stories. Ideally, the latency, availability, and consistency currently experienced by CI users should not change significantly.

Pre-IIMS, a single database (e.g., Berkley database (BDB)) contains all IAM data for authentication in an ABAC system, including users, groups and dynamic groups (DGs), for a region. The database (e.g., BDB) is hosted on a single identity data plane host (IDDP host) with the data duplicated on other data plane hosts in the same region. The data is populated to the BDBs from IAM control plane key value store service (e.g., Kiev) via a background thread. However, the IDDP can struggle to scale horizontally if it stores all IAM entities, IDCS users, and IDCS groups because the users, groups, and entities can exceed the available storage capacity for a single database (e.g., BDB) within the hosting service in some implementations.

Instead of storing all IAM data in a single BDB (e.g., database), the users, groups and DGs, that would be stored in the identical pre-integration BDBs, can be moved from the IDDP (IAM dataplane) to a new entity called the identity data shard service (IDSS). The IDSS consists of one or more shards, called IAM IDSS fleets (e.g., fleets), with each fleet containing host machines. The host machines include one or more BDBs (e.g., databases) and each host machine within a single IAM IDSS fleet contains identical data.

In order to store the data, the IAM user, group, and DG data is broken into stripes and groupings of these stripes are called identity cloud service (IDCS) replication shards (e.g., data stripes). The replication shards contain data—user identifiers (userID), group identifiers (groupID), group memberships, dynamic group (DG) membership, dynamic group identifiers, and client identifier clientID-secret information—that the IDDP needs for authentication and authorization. In some implementations, the IDDP can be asked to make authentication decisions in ABAC systems and RBAC systems.

The data can be divided among the IDSS fleets with each fleet containing one or more replication shards. While a single IDSS fleet can contain more than one IDCS replication shard, a shard cannot be split across more than one IDSS fleet. However, a single replication shard can be spread across more than one BDB within an IDSS fleet's host machine. These host machine BDBs are backfilled from the IDCS replication shards via IDSS background threads. This solution allows the data to be scalably stored across multiple databases rather than a single local BDB.

To locate data pre-IIMS, the IAM would look up authorization data for an entity in a local database (e.g., BDB). The IAM would then use the authorization data to make a decision about that entity. However, post-unification, the amount of authorization data can increase substantially so there can be too much data for local storage. Instead of being stored locally, the authorization data can be stored in the IDSS fleets and locating the data can be facilitated be a means to determine which IDSS fleet is hosting the relevant data.

To locate the data post-IIMS, the IAM can contain a domain (stripe) to shard mapping that is maintained by the IDSS fleets. In some implementations, IDSS fleets store data for locations across all IDSS fleets in a metadata database (e.g., BDB). These metadata BDBs contain entity ID (e.g., user ID, group ID) to domain ID mapping. To locate data, the IDDP host (IAM dataplane fleet) can send a request for the entity's domain ID to an IDSS fleet. The request can contain the entity's ID. The IDSS can respond to the request by sending the domain ID to the IAM data plane and the IDDP host can store the domain ID in local cache.

The IAM control plane can also contain metadata about each domain and this data can be synced with the IAM control plane to a local BDB (e.g., database) in the IDDP. The metadata can include the replication shard ID associated with each domain ID and the retrieved domain ID stored in the local cache can be used to look up the replication shard ID.

Each IDSS fleet can also contains shard ID to fleet ID mappings for the IDSS fleet. The IDDP host can send the replication shard ID to an IDSS fleet to determine the fleet ID for the IDSS fleet with that shard ID. Once the fleet ID is obtained, the IDDP can send a request to that IDSS fleet for the authorization data for the original entity ID. The IDDP can then use the authorization data to make a decision about the entity.

FIG. 1 shows a simplified diagram 100 of attribute-based access control (ABAC) using policies according to an embodiment. An attribute based access control (ABAC) model using a policy language to protect resources and allow access to security principals. Cloud infrastructure (CI) can comprise a set of cloud services that can enable customers to build and run a range of applications. CI can include services that offer functionality via resources that can be instantiated and managed using application programming interfaces (APIs) exposed by such a service. These APIs can be the 'Control Plane' of the service. Once a resource is instantiated, the resource can be interacted with using APIs exposed by the service publishing the resource. Additionally, resources may expose unique endpoint(s) on the instance. These endpoints can allow access to a resource instance via browsers, custom clients, command-line interface (CLI) or a software development kit (SDK). Such endpoints can be the 'Data Plane' of a resource.

Turning to FIG. 1 in greater detail, the diagram shows two tenancies (tenancy 1 103 and tenancy2 106). A tenancy can be a secure, isolated partition within CI where customers can create, organize and administer cloud resources. A CSP can create a tenancy for each customer/company that signs up for an account. While two tenancies are shown in FIG. 1 embodiments of the present disclosure can include different tenancy configurations with different amounts of tenancies.

A tenancy can contain one or more compartments such as compartment1 109, compartment2 112, or compartment3 115. A compartment can be a logical container for a collection of related resources (such as instances, block volumes, databases, etc.), and a compartment can be used as a target for allowing access to users, groups, or domains in a tenancy. Compartments can be nested within other compartments to make a hierarchy. Compartments can be marked with key/value pairs called tags that can be attached to various resources in CI. Tags can be used to make to make arbitrary sets of resources that may span compartments. A resource can be tagged with multiple such key/value pairs that allow making (optionally overlapping) sets of resources based on any dimension represented by tag values of a tag key.

A compartment can include a container for managing an isolated set of identity principals within a tenancy called a domain (e.g., domain1 118, domain2 121, domain3 124). A domain can contain users that represent human users accessing the system and groups that can be static collection of such users. A tenancy can ship with a default domain with a single administrator user and an administrators group that can have full access to all resources in the tenancy. The administrator can create other users in the domain, and the administer access to various resources in the tenancy from users/groups in the domain by using authorization models offered by services publishing those resources. One or more domains can be created by an administrator in one or more compartments in the tenancy. A domain can contain entities offered by the IAM service of CI, such as users, groups, applications, app-roles, etc. A domain can manage isolated user populations and therefore groups in a domain can contain users from the same domain.

A resource can be contained in a compartment and resources (e.g., resource 127) can be managed via control plane APIs that are exposed by the service publishing the resource. A resource, optionally, can expose an endpoint 131 for security principals to interact with the resource directly. These endpoints, optionally, can be registered in one or more domains of the tenancy as an application instance. For example, endpoint 131 can be accessed by domain1 118, domain2 121, and domain3 124. The endpoints can publish app roles associated with the instances in the domain. An administrator can allow access to these endpoints restricted to actors (security principals) in the same domain via app roles published by corresponding app instances.

Actors (e.g., security principals) can include a service principal that is global to an CI realm. Service principals can represent the identity of a service or a product in CI and service principals can be used to identify services in the control plane. Service principals cannot be assigned to groups in some embodiments. A user principal can represent the identity of a human user in CI. Users 134 may interact with service control planes via the CI console. The console can provide administrative functionality that can be used to manage resources or interact with resources endpoints such as web applications. via browser clients. A collection of users can be added to a group in the same domain. Application client security principals can represent the identity of application instances in a domain. These identities can be used to integrate and secure interaction between various application instances within a given domain.

Resources can access other resources by identifying themselves as a security principal (e.g., resource principal). A database resource, for instance, may use its own identity to make a backup and store it in a storage bucket in the tenancy. A collection of resources can be defined by using a dynamic group with a matching criteria to identify members of the collection. A dynamic group can allow grouping of a set of resources based on a matching rule which comprises the definition of a dynamic group. dynamic groups, like groups in a domain, can be used for allowing members of the group to access the resources in the tenancy.

In an attribute-based control (ABAC) system, resources in compartments are secured using CI policies. A policy 137 in CI can allow a collection of actors, such as users 134 or a group 141 in a domain, to perform a set of operations on a type of resource (e.g., resource 127). Policies 137 can be written close to the target—either in the same compartment as the target(s) or one of its ancestors. Targets can be users 134, groups 141, or dynamic groups. API access to a resource instance can be secured by policies, and the policies 137 can refer to security principals or targets using attributes of those entities (e.g., tags). The attributes can be used to determine whether access to a target is allowed by a policy. Policies offer a set of granular controls that can be used to restrict access using attributes such as tags of the entities involved in operation (actor, actor's group, target, target's compartment) in a where clause attached to the policy 137. Policies 137 can be written to allow access to users across domains across tenancies to access resources in a given tenancy/compartment.

Figure 2:
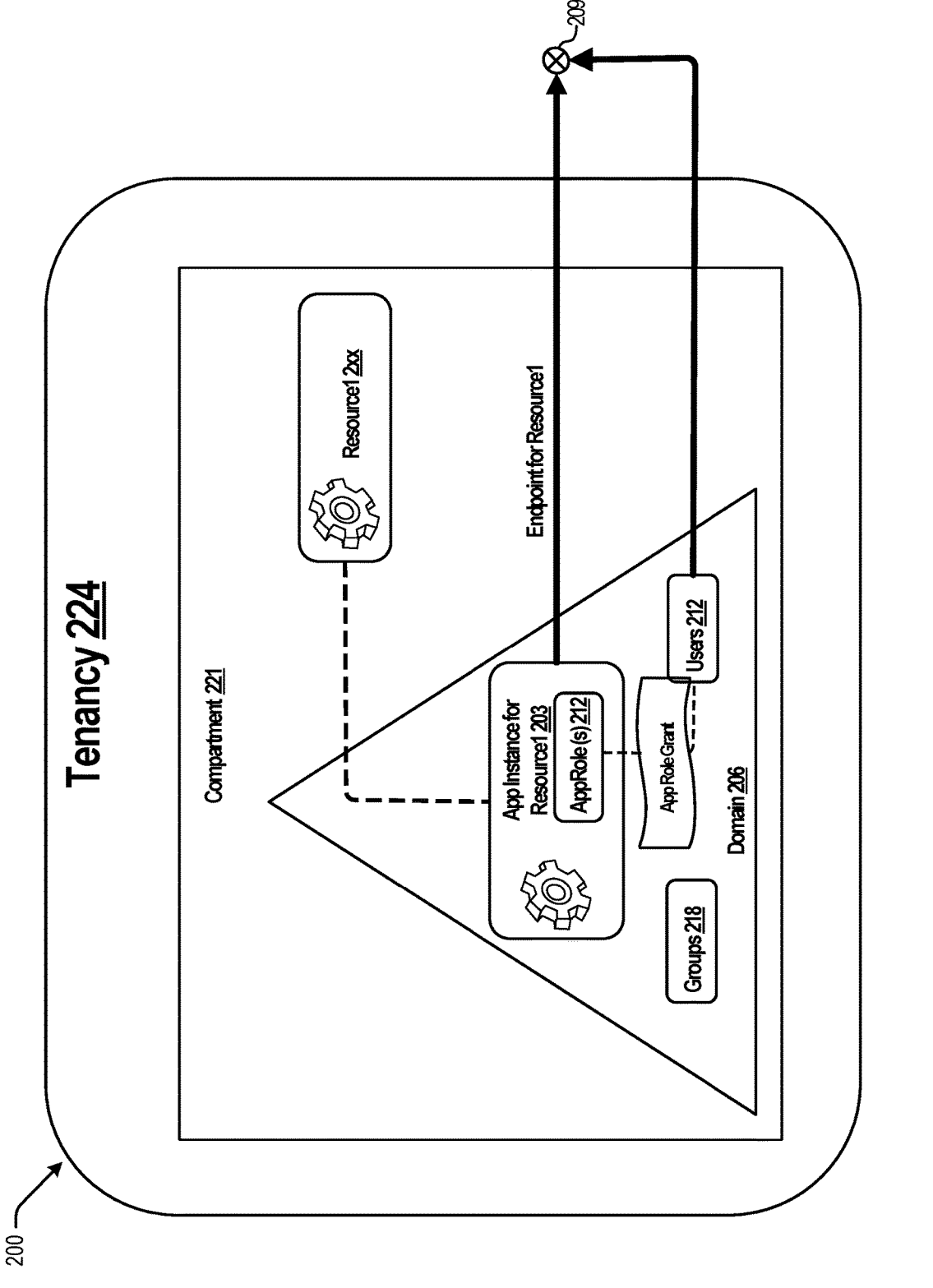
FIG. 2 shows a simplified diagram of a role-based access control (RBAC) system according to at least one embodiment.

FIG. 2 shows a simplified diagram 200 of a role-based access control (RBAC) system according to at least one embodiment. A service can optionally publish an application instance (e.g., app instance for resource1 203) in a domain 206, and the application instance can represent the data plane endpoint 209 of a resource published to a compartment 221 within a tenancy 224. Application instances also expose sets of permissions (app roles 212) that can allow access to the data plane endpoints 209. App roles 212 can be granted to security principals (e.g., users 215, groups 218) or collections of those security principals present in the same domain as the application instance. App roles 212 of an application instance cannot be granted to security principals in other domains in the same tenancy or other tenancies in some embodiments.

Figure 3:
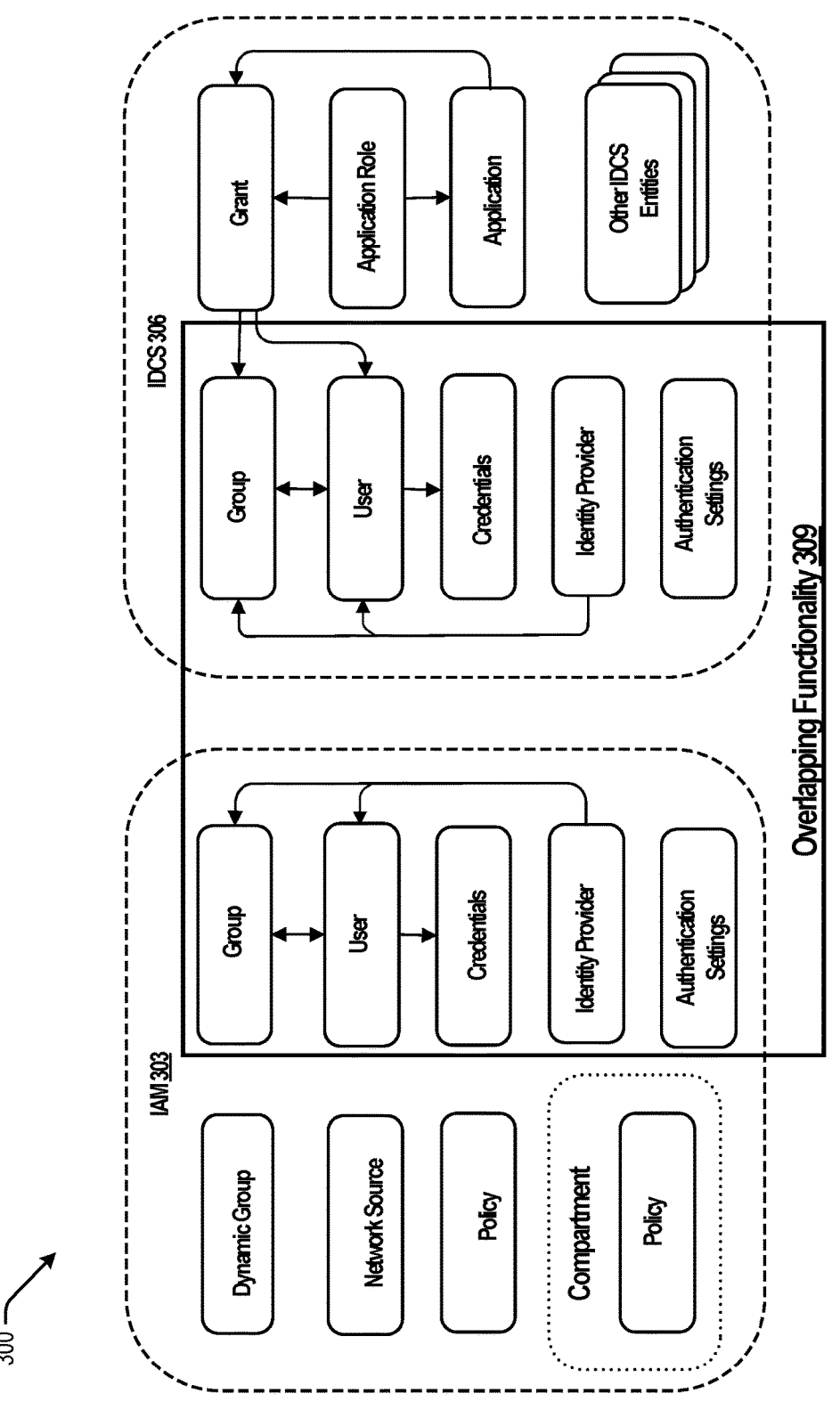
FIG. 3 is a simplified diagram showing a comparison between Infrastructure Identity and Access Management (IAM) service and the Identity Cloud Service (IDCS) functionality according to at least one embodiment.

FIG. 3 is a simplified diagram 300 showing a comparison between Infrastructure Identity and Access Management (IAM) service and the Identity Cloud Service (IDCS) functionality according to at least one embodiment. IAM 303 is an attribute-based access control (ABAC) system like the one described above in relation to FIG. 1. IDCS 306 is a role-based access control (RBAC) system like the one disclosed above in relation to FIG. 2. The overlapping functionality 309 between IAM 303 and IDCS 306 are shown in diagram 300.

Figure 4:
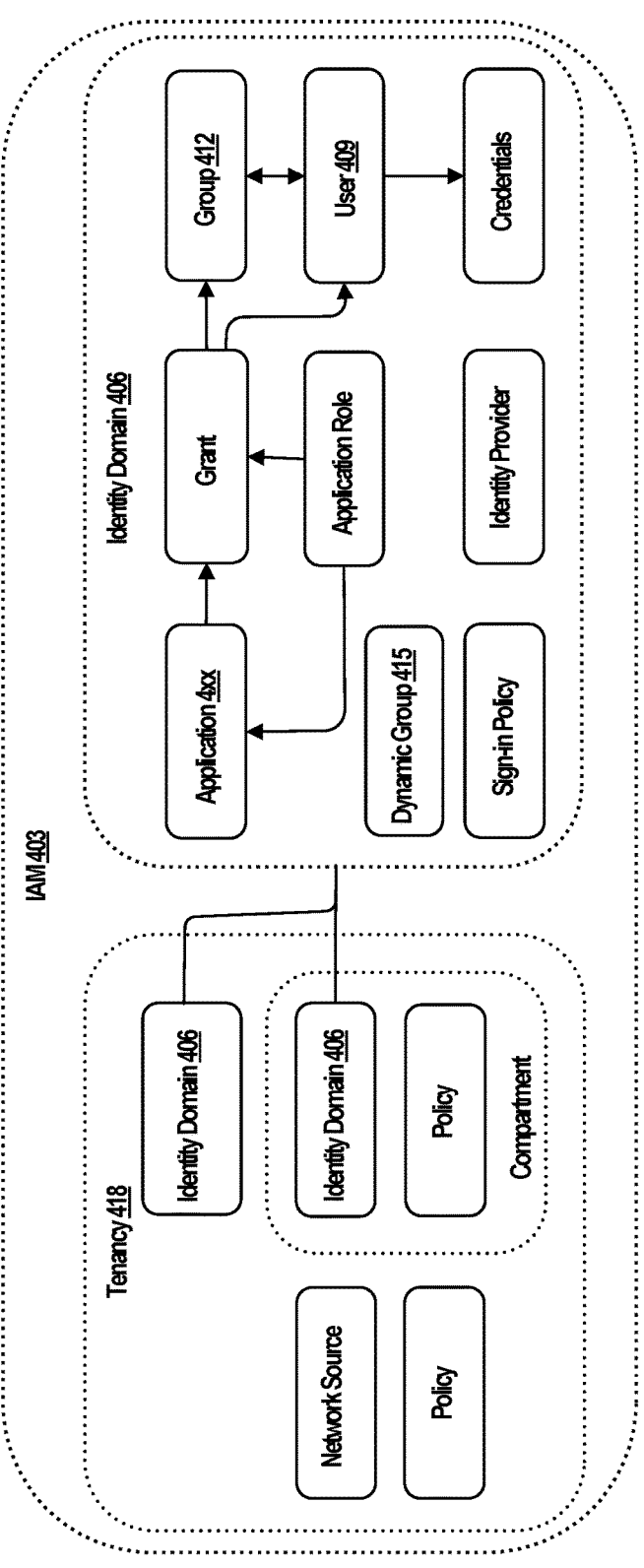
FIG. 4 is a simplified diagram showing a simplified diagram of the Integrated Identity Management System (IIMS) according to at least one embodiment.

FIG. 4 is a simplified diagram 400 showing a simplified diagram of the Integrated Identity Management System (IIMS) according to at least one embodiment. In certain embodiments, in the IIMS, IDCS will be merged into IAM 403, with IDCS stripes exposed within IAM as Identity Domains 406. There can be a single sign-up experience, a single control plane with a single Console, software development kit (SDK), and command-line interface (CLI) for managing identities and policy. Data plane authentication and authorization will be supported through both the IAM data plane API and the per Identity Domain IDCS APIs. This can achieve compatibility for existing IaaS, PaaS, SaaS, and 3rd party integrations while providing customers with a single identity system.

In certain implementations, an Identity Domain 406 can be added to every tenancy and existing users 409 and groups (e.g., group 412, dynamic group 415) can be moved into the domain. Existing IDCS stripes can appear as additional Identity Domains 406. Identity Domains 406 can support IAM credentials and IAM Policy can be extended to reference entities within an Identity Domain 406. An Identity Domain 406 can support existing IAM and IDCS functionality and API contracts.

In certain embodiments, Identity Domains 406 can be used for isolating production and non-production environments, modelling corporate entities or subsidiaries, and for separating user populations such as corporate users from end customers. To satisfy the data sovereignty concerns of multi-national companies, Identity Domains 406 can support primary (read/write) and subscribed (read-only) region replication settings different from (although a subset of) the tenancy 418.

Figure 5:
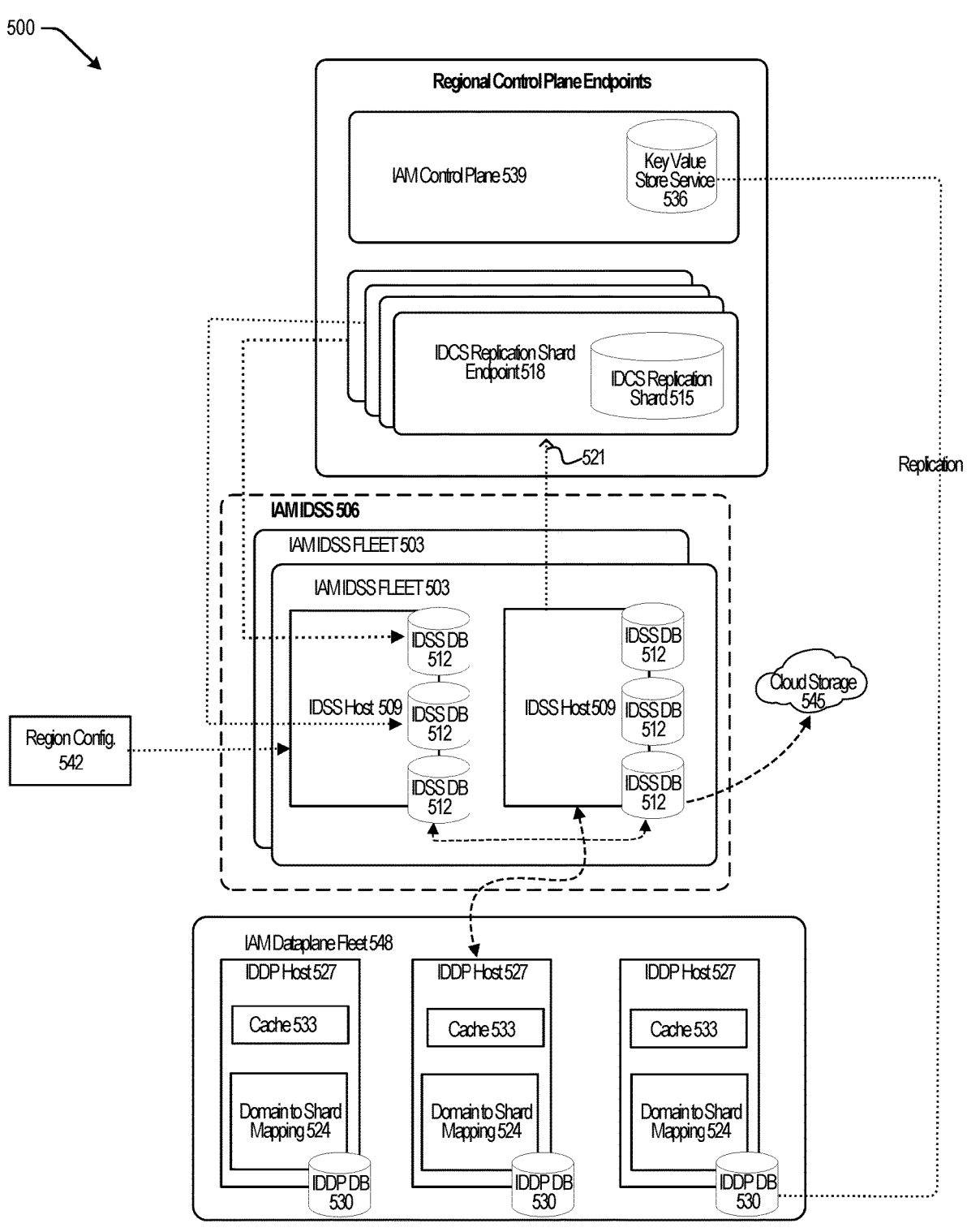
FIG. 5 is a simplified diagram of an architecture for implementing the Integrated Identity Management System (IIMS) according to at least one embodiment.

FIG. 5 is a simplified diagram of an architecture for implementing the Integrated Identity Management System (IIMS) according to at least one embodiment. Authentication data including users, groups, and DGs can be stored in identity data shard service (IDSS) fleet(s) 503. While two IDSS fleet(s) 503 are shown, the IDSS 506 can include fewer or more fleets in various embodiments. An IDSS fleet 503 can contain one or more IDSS host(s) 509 that include one or more IASS databases (DBs) 512 (e.g., BDBs). Each IDSS host 509 within a single IAM IDSS fleet can contain identical data. However, the IASS DB(s) 512 within an IDSS host 509 can contain different information (e.g., each host can contain identical information, but the information can be split across four databases within the host).

Authentication data such as, user, group, and DG data, can be broken into stripes and groupings of these stripes can be called an identity cloud service (IDCS) replication shards 515. The authorization data in the IDCS replication shards 515 can include user identifiers (userID), group identifiers (groupID), group memberships, dynamic group (DG) membership, dynamic group identifiers, and client identifier clientID-secret information. The data stored in the IDCS replication shards 515 can be used by the IDDP to make authentication decisions in ABAC systems and RBAC systems. The IDCS replication shards 515 can be accessed via APIs called IDCS replication shard endpoints 518.

The data can be divided among the IDSS fleets 503 with each fleet containing data from one or more IDCS replication shards 515. While a single IDSS fleet can contain data from more than one IDCS replication shard 515, a shard cannot be split across more than one IDSS fleet 503. However, a single replication shard can be spread across more than one IDSS DB 512 within an IDSS fleet's host 509. These IDSS DBs 512 can be backfilled from the IDCS replication shards 515 via IDSS background threads 521 between the IDCS replication shard endpoints 518 and the IDSS DBs 512.

Authentication data can be located using a domain to shard mapping 524 that is maintained by the IDDP host(s) 527. In some implementations, IDSS fleets can store data for locations across all IDSS fleets (e.g., domain to shard mapping 524) in an IDDP database (DB) 530 (e.g., metadata database). The IDDP DB(s) 530 can contain entity ID (e.g., user ID, group ID) to domain ID mapping (e.g., the domain to shard mapping 524).

To locate data, the IDDP host 527, within the IAM dataplane fleet 548, can send a request for the entity's domain ID, containing the entities ID, to an IAM IDSS fleet 503. The IAM IDSS fleet 503 can respond to the request by sending the domain ID to the IAM dataplane fleet 548 and an IDDP host 527 can store the domain ID in local cache 533. A caching strategy for cache 533 can avoid redundant calls to IDSS. User ID to domain ID mapping information and user ID to user information can be stored in an incremental cache as part of the caching strategy. The incremental cache can be checked in response to a query, and the IAM IDSS 506 may be called if the information is not in the cache.

The IAM control plane 539 can contain metadata about each domain and this data can be synced from the IAM control plane 539 to the IDDP DB 530 in the IAM dataplane fleet 548. The metadata can include the replication shard ID associated with each domain ID and the retrieved domain ID stored in the local cache 533 can be used to look up the replication shard ID.

An IAM IDSS fleet 503 can contain shard ID to fleet ID mappings for the IAM IDSS fleet 503. The IDSS host 509 can send a request containing the replication shard ID to an IDSS fleet to determine the fleet ID for the IDSS fleet containing the shard associated with the replication shard ID. Once the fleet ID is obtained, the IDDP can send a request to that IDSS fleet for the authorization data for the original entity ID. The IDDP can then use the authorization data to make a decision about the entity.

IDCS can surface data to the IDSS fleet 503 through an API (e.g., IDCS replication shard endpoint 518). Backing this data can be a set of replication log tables (IDCS replication shards 515), that can host the logs for a set of domains (e.g., domain1 118, domain2 121, domain3 124). The IDCS replication shard endpoint 518 can allow targeting of a specific IDCS replication shard 515 (e.g., targeted using a query parameter or path variable). Assignment of a domain to a replication shard can be region specific and made available as part of the domain info in the key value store service 536.

Domains can be mapped to IDSS hosts 509 at the granularity of an IDCS replication shard 515. Multiple IDCS replication shards 515 may be assigned to a single IDSS host

509. Assignment can be done so that each IDSS host 509 can host roughly even amount of data. This assignment can be region specific and made available to IDSS fleets 503 through the region configuration 542. IDCS replication shards 515 can have data for the following entities: Users, Groups, GroupMemberships, Dynamic Groups, ClientId-Secret information. These are the pieces of information that IDDP can use for authentication and authorization. ClientId-Secret information can be used to exchange an IDCS authorization token for an IAM token through IDDP.

IDSS hosts 509 can have an IDSS DB 512 per IDCS replication shard 515. This can allow for a single back fill channel and back-up retrieval scheme for each replication shard. IDCS replication shard 515 to IDSS host 509 mapping (e.g., domain to shard mapping 524) can allow the IDDP hosts to route requests for User/Group information to the right IDSS host 509. IDDP DB 530 can get the region specific replication shard ID information for the domain of User/Group from the key value store service 536.

IDDP hosts 527 can use the domainID of the entity it wants to lookup to route the request correctly. Some requests provided to the IDDP host 527 may not have the domainID of the entity. For example, the IDDP host 527 may only has tenant ID, userID and public key fingerprint for a signed requests from a user. In this scenario the IDDP host 527 can get the domainID for the user from the IAM IDSS 506 that hosts the user/group data.

When an IDDP host 527 calls an IDSS fleet 503 for information about a particular User/Group in a domain, the IDDP host 527 can pass the domain ID and replication shard ID for the domain to the IDSS fleet 503. The IDDP host 527 can have a copy of the per region replication shard ID of the IDSS host 509 that was retrieved from the key value store service 536. The IDSS host 509 can keep an IDSS DB 512 on a per replication shard basis. The IDSS host 509 can find the IDSS DB 512 for the replication shard ID received from the IDDP host 527 and lookup the User/Group information. The IDDP host 527 can return the looked up User/Group information to the IDDP host 527 requesting the information.

At startup, each IDSS host 509 can know which IDCS replication shard 515 to talk with via the region configuration 542. An IDCS replication shard can have a single regional endpoint (e.g, IDCS replication shard endpoint 518) that can have a getLogs(replicationShardId, lastSequenceId) API. Each IDSS host 509 can read getLogs on a background thread for each IDCS replication shard 515. This can mitigate the risk that one busy IDCS replication shard 515 blocks updates from other shards. Since there can be separate IDSS DB 512 for each IDCS replication shard 515 the risk of contention from the activity on multiple background threads can be mitigated.

When IDSS hosts 509 poll the IDCS replication shard endpoint 518, the IDSS host 509 can pass in a sequence number that informs the current sync point so that only the newer records are returned. When IDSS restarts it may load IDSS DB 512 snapshots that have been saved, and the snapshots can include the backfill pointer (e.g., the last sequence number synced). The sequence number can be saved in a IDSS DB 512 and the sequence number can be updated with updates to the IDSS DB 512.

Multiple sync points may need to be tracked with, for example, one sync point for each IDCS replication shard 515, as the IDSS DBs 512 can have content from every IDCS replication shard 515. On startup, an IDSS host 509 can lookup the sync points for IDCS replication shards 515 from both the IDDP DB 530 as well an IDSS DB 512 and start reading from the older of the two to reduce the risk that records are missed. The update mechanism can ensure that the IDCS replication records will be skipped if the BDB being updated is ahead of the current sequence number.

At startup the data in a IDSS host 509 can be synced using the following procedure: 1) The IDSS host 509 can look at the local directory for an existing IDSS DB 512 and start the DB if one is found; 2) If no local IDSS DB 512 copy is found, the host can look in cloud storage 545 for the latest IDSS DB 512 snapshots matching the replication shard id associated with the IDSS DB 512; 3) If one exists it will download the snapshot and start the IDSS DB 512 using the snapshot; 4) If a snapshot does not exist the IDSS host 509 can contact a currently running IDSS host in the IAM IDSS fleet 503 fleet to obtain an IDSS DB snapshot; 5) If no other IDSS host 509 in the IAM IDSS fleet 503 is running, the IDSS host 509 that is starting up can contact the IDCS replication shard endpoint 518 for a sequence ID; 6) If no sequence ID is found, the IDSS host 509 may not be able to startup as the host is too far behind and no snapshots are found.

An IDSS host 509 that is currently running can sync data with an IDCS replication shard 515 using the following procedure: 1) The IDSS host 509 is up and in a valid and healthy state with an IDSS DB 512 running; 2) A background thread 521 reads the IDCS replication shard endpoint 518 using the last known sequence id for the IDSS host 509; 3) The background thread 521 for the IDSS host 509 can process these events into the IDSS DB 512 and update the last sequence number.

Figure 6:
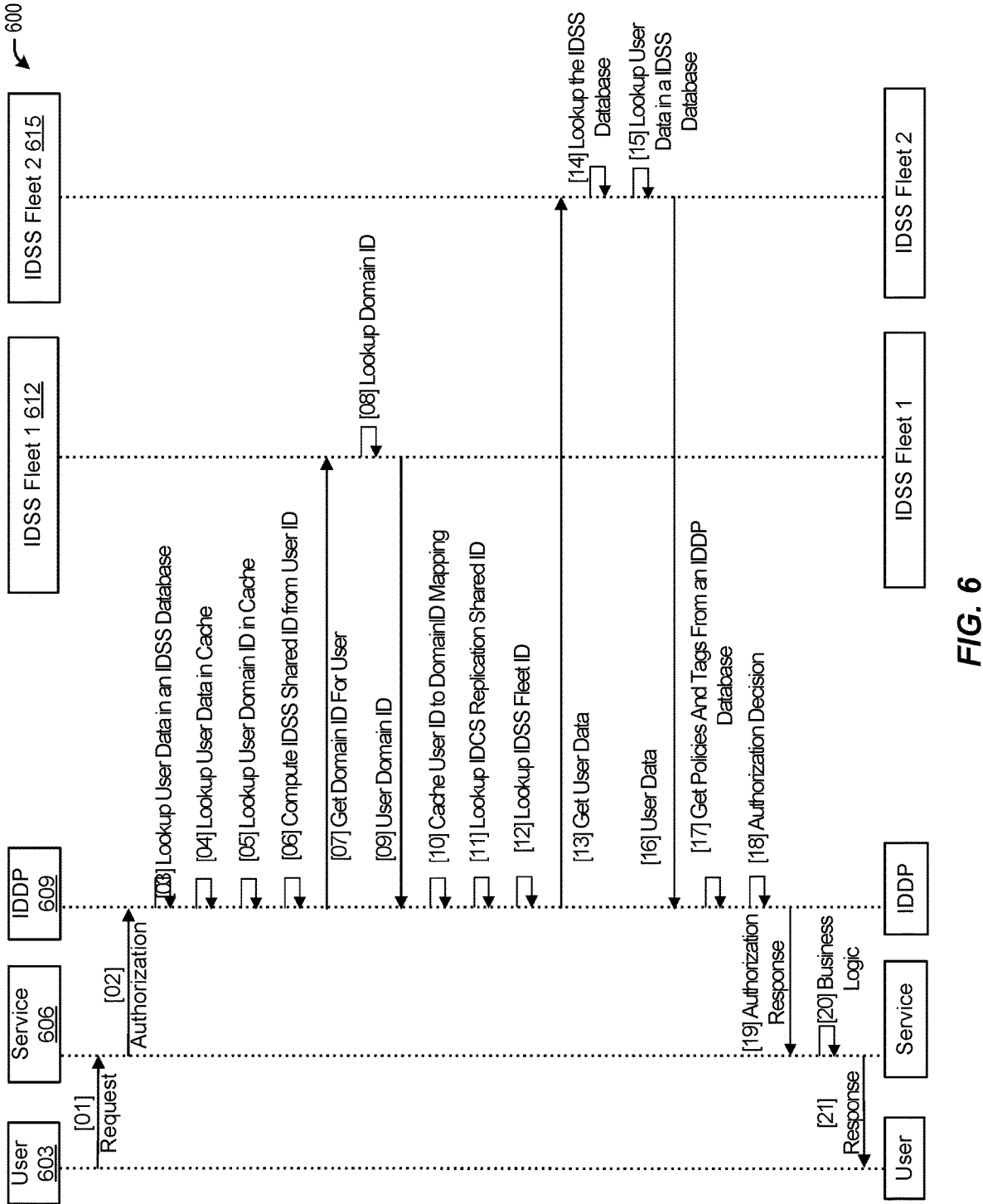
FIG. 6 shows a sequence diagram of a process for authorizing a user with the Integrated Identity Management System (IIMS) according to at least one embodiment.

FIG. 6 shows a sequence diagram 600 of a process for authorizing a user with the Integrated Identity Management System (IIMS) according to at least one embodiment. The sequence can begin at [01] with a user 603 sending a request to a service 606 hosted on the CI. The request can be signed with a private key for the user 603 and the service 606 can verify the signature using a user public key. The request can include a user identifier (ID) associated with the user. At [02], the service 606 can send a request for authorization to the IDDP 609. At [03], the IDDP 609 can look up user data in a local database (e.g., BDB, IDDP 530). At [04] the IDDP 609 can search for user data in local cache (e.g., cache 533). The cache can store data from previous requests and the user data may be in the cache if there was a past search for the user data. If the user data is found at [03] or [04] the process can proceed to [17].

At [05], the IDDP 609 can search the local cache for the user domain identifier (ID). The local cache may contain the user domain ID (IDSS host ID) if there has been a previous search for the user. If the local cache contains the domain ID the process can proceed to [10]. At [06], IDDP 609 can determine which IDSS fleet (e.g., IDSS shard, IDSS fleet 503) contains the domain ID for the user (e.g., user ID to domain ID mapping). At [07], the IDDP 609 can request the Domain ID for the user from [01]. The IDDP 609 can request the Domain ID from the IDSS fleet identified at [06] (e.g., IDSS fleet 1 612). At [08], IDSS fleet 1 612 can look up the domain ID for the user. IDSS fleet 1 612 may look up the domain in an IDSS DB for the IDSS fleet. At [09], IDSS fleet 1 612 returns the domain ID (e.g., IDSS host ID) identified in [08].

At [10], the IDDP 609 can cache the user ID to domain ID mapping in local cache. The mapping may remain in the local cache for an indefinite time period and the user ID to domain ID mapping may be removed if the cache runs out of memory. At [11], the IDDP 609 can look up the IDSS fleet identifier (ID) for the host ID (e.g., IDSS host ID) associated with the user from [01]. The IDDP 609 can look up the IDCS replication fleet ID (e.g., IDCS replication shard ID) in a IDDP DB. At [12], the IDDP 609 can look up the IDSS fleet ID for the fleet that hosts the domain data associated with the domain ID. At [13], the IDDP 609 can call the IDSS fleet associated with the IDSS fleet ID (e.g., IDSS fleet 2 615).

At [14], IDSS fleet 2 615 looks up the local database that hosts the replication shard. At [15], the IDSS fleet 2 615 can look up the user data in the IDSS DB identified at [14]. At [16], the IDSS fleet 2 615 can return the user data that was looked up at [15]. At [17], the IDDP 609 can retrieve the policies or tags needed to authorize the user identified at [01] from a local database in the IDDP. At [18] the IDDP 609 can decide whether to authorize the user using the policies or tags retrieved at [17]. At [19], the IDDP 609 can return the authorization response to the service 606. The authorization response can be a determination that the user should be authorized or a decision that the user should not be authorized. At [20], the service 606 can perform business logic based on the authorization response returned at [19]. At [21], a response can be transmitted from the service 606 to the user 603.

Figure 7:
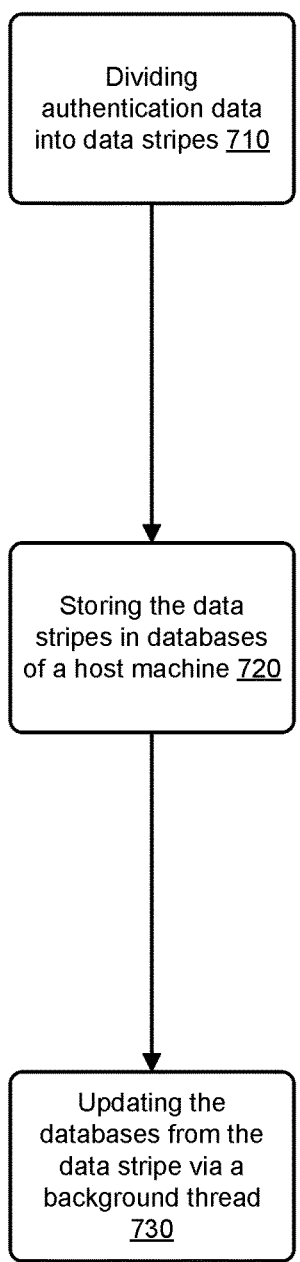
FIG. 7 shows a simplified diagram of a process for storing authentication data according to at least one embodiment.

FIG. 7 shows a simplified diagram of a process for storing authentication data according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 710, the authentication data can be divided into data stripes. The authentication data can be data that an authentication service uses to authorize and authenticate users and the authentication data can be divided by the authentication service. The authentication data can include at least one of a user identifier (userID), a group identifier (groupID), a group membership, a client identifier (clientID), dynamic group (DG) membership, or a adynamic group identifier. The authentication service can be configured to make authenticate users with ABAC and RBAC techniques. The authentication data can be from at least one of a RBAC system or an ABAC system. Dynamic group membership can be determined using a set of matching rules.

At block 720, the authentication data from the data stripes can be stored in databases of a host machine. The host machine can be a host machine of a fleet and the fleet can contain one or more host machines. The database can be the IDSS DB 512 and the host machine can be an IDSS host 509 from an IAM IDSS fleet 503. The authentication from a single stripe of the one or more data stripes can be stored in a single host machine. The authentication data from a single stripe can be stored in one or more databases within a single host machine. The one or more host machines within a fleet can contain identical authentication data.

At block 730, the databases can be updated from the one or more data stripe via a background thread. The stripes can be updated from an IDCS replication shard 515 using background thread 521.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
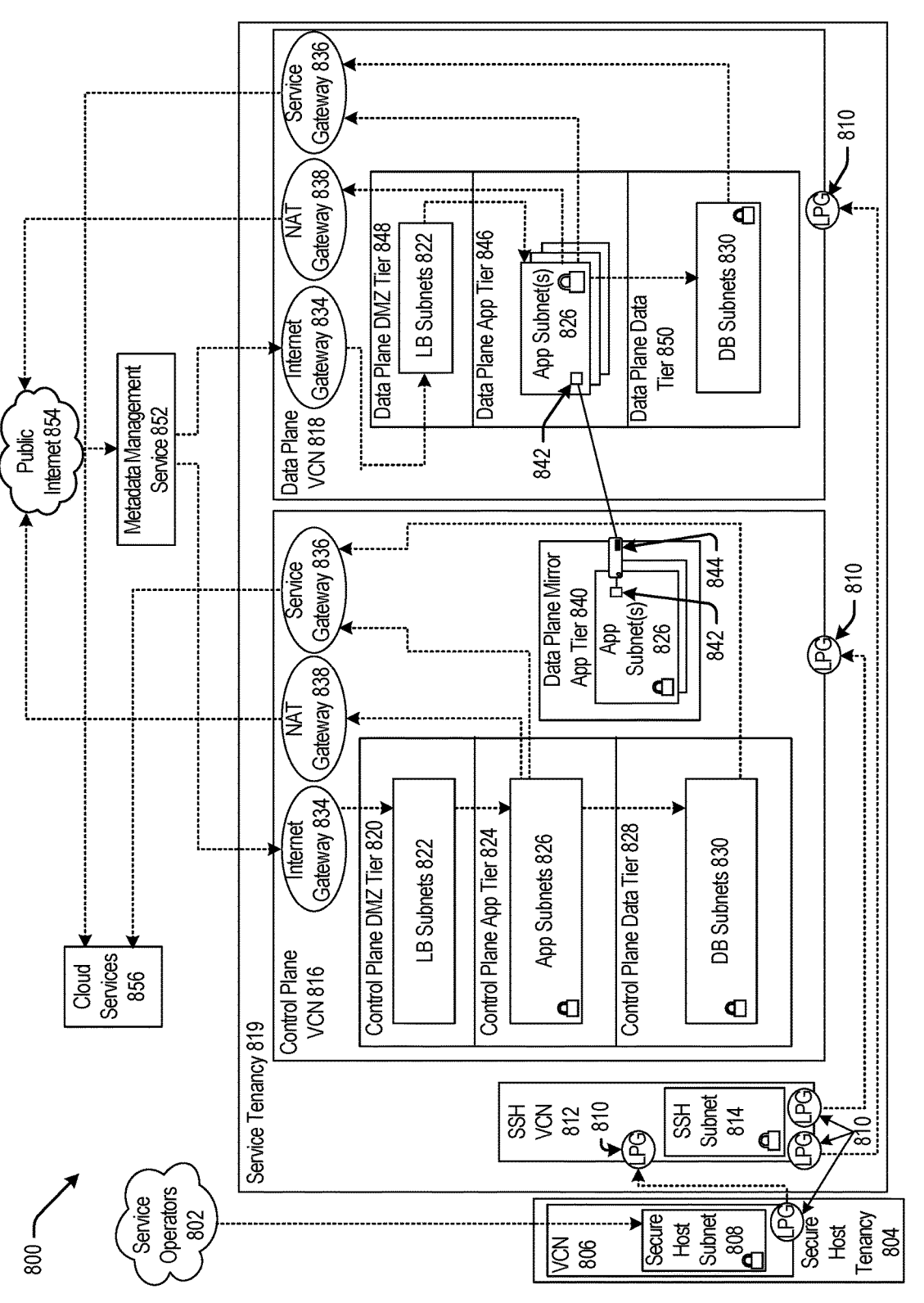
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
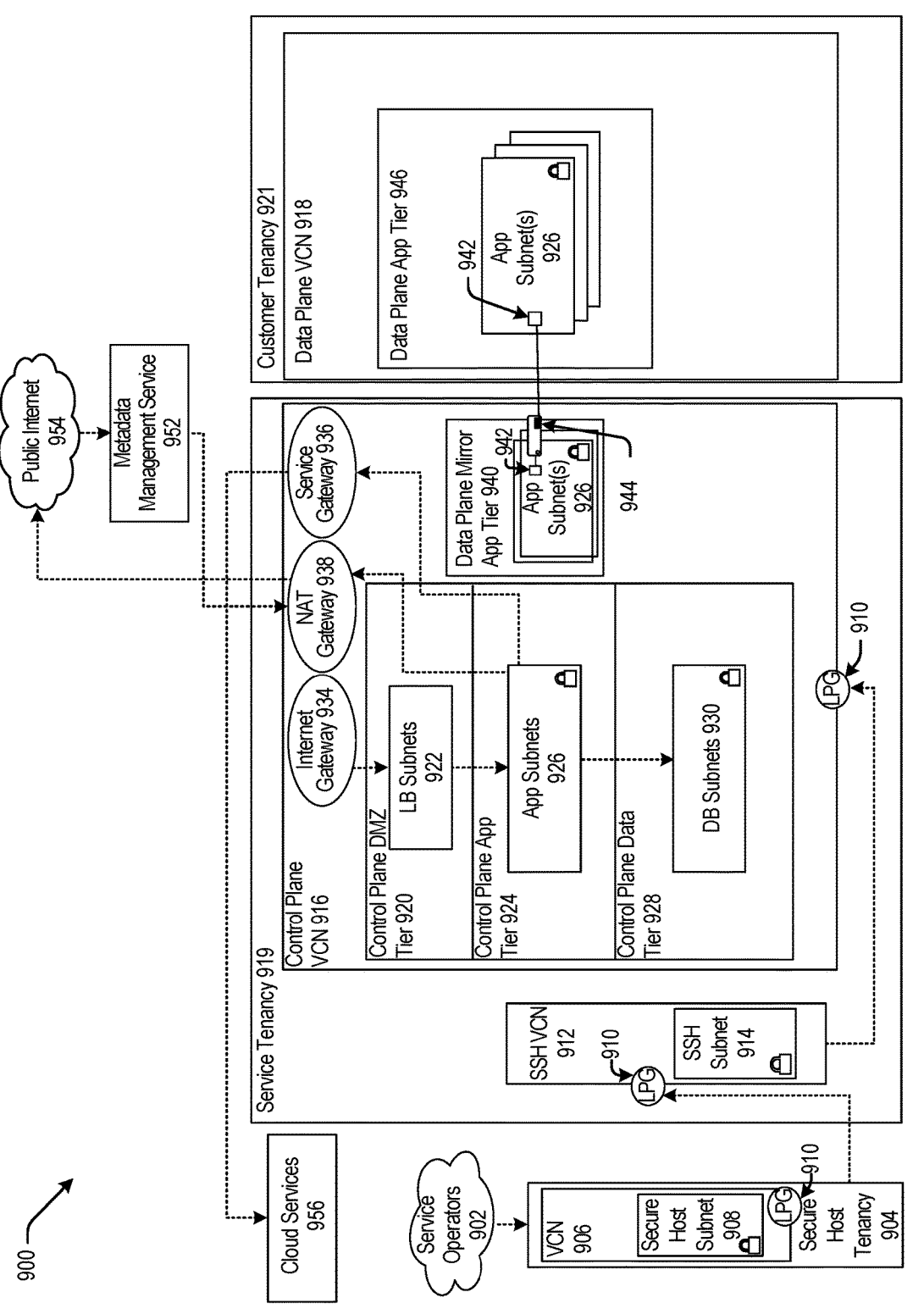
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
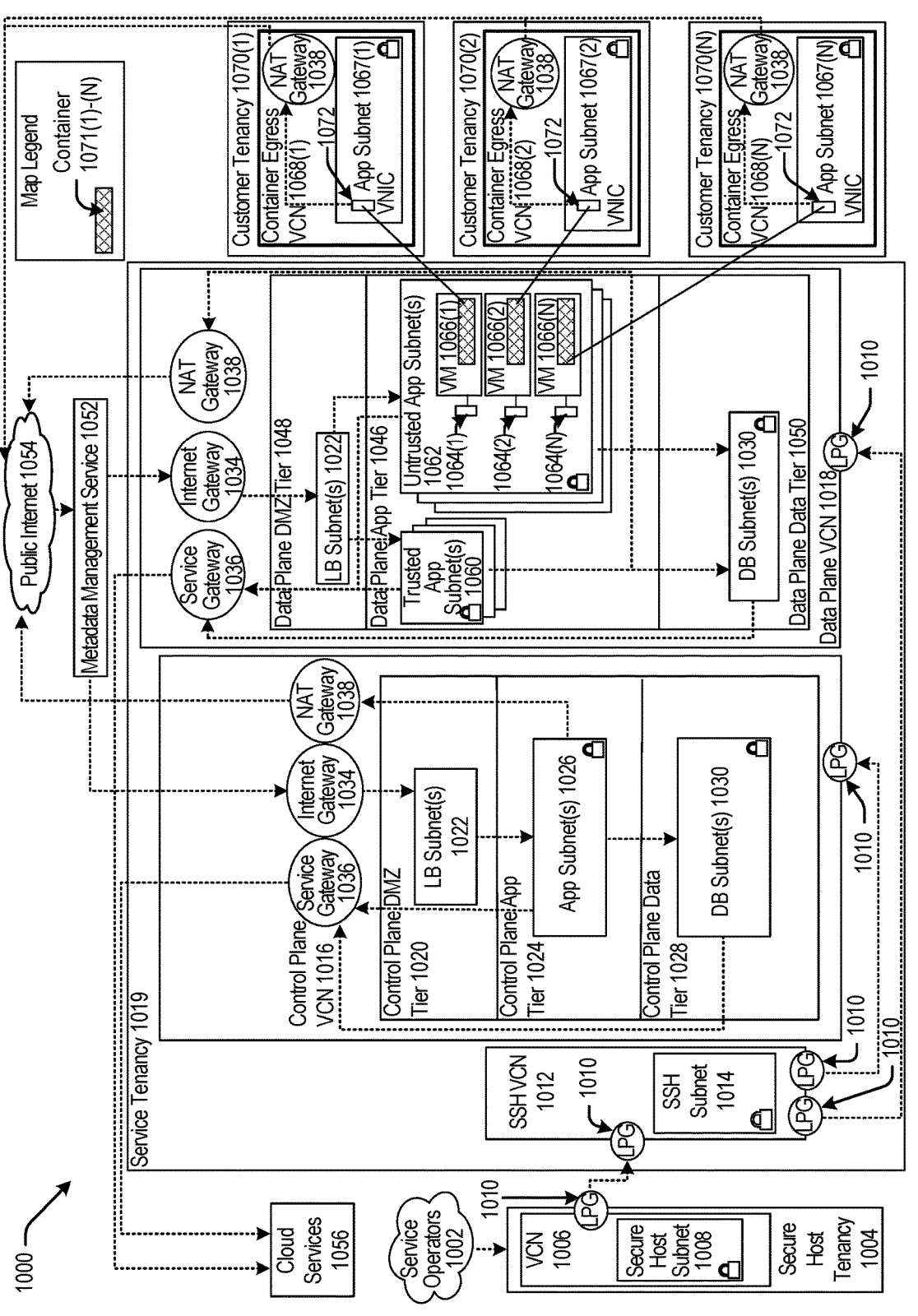
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
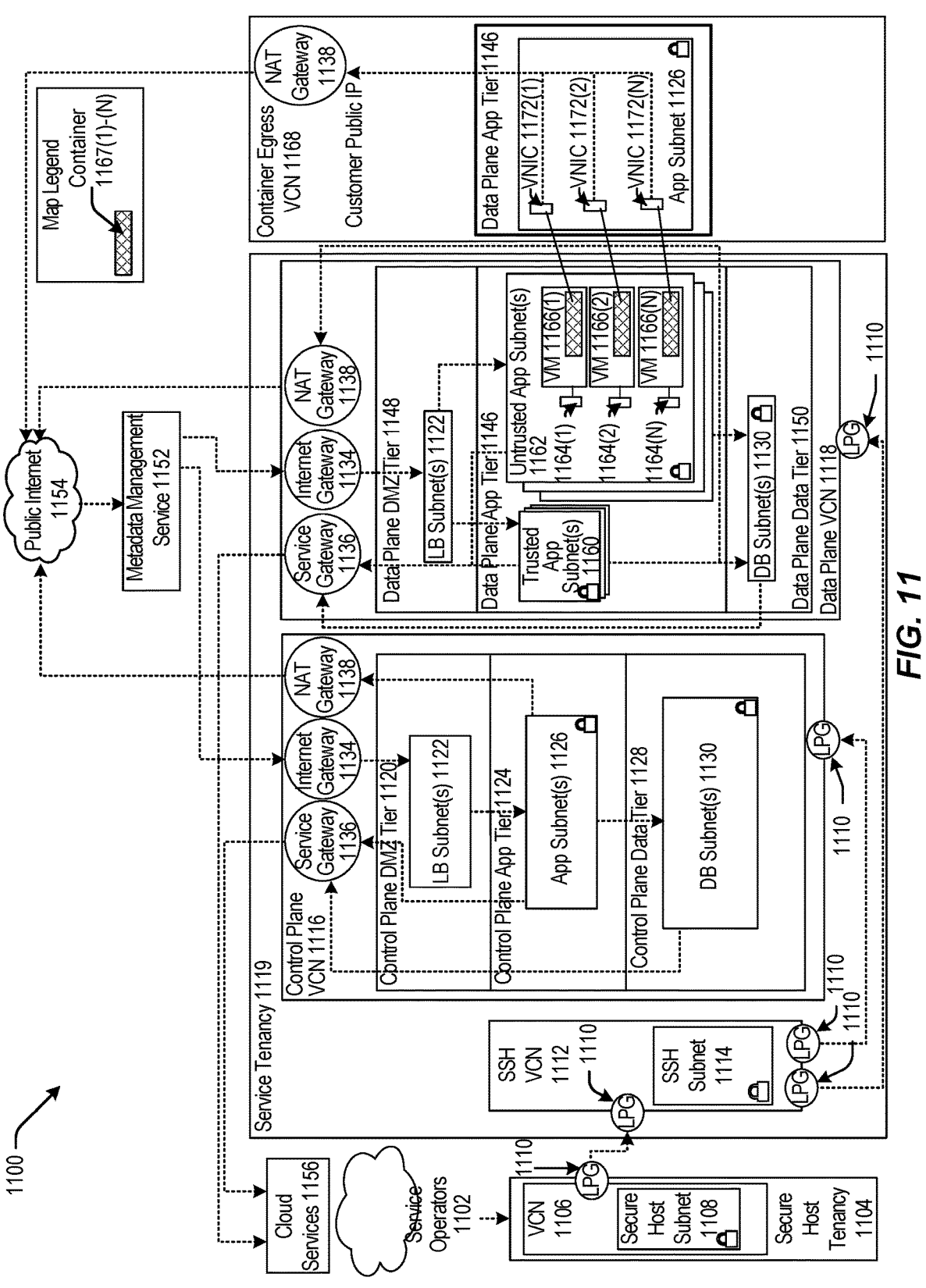
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
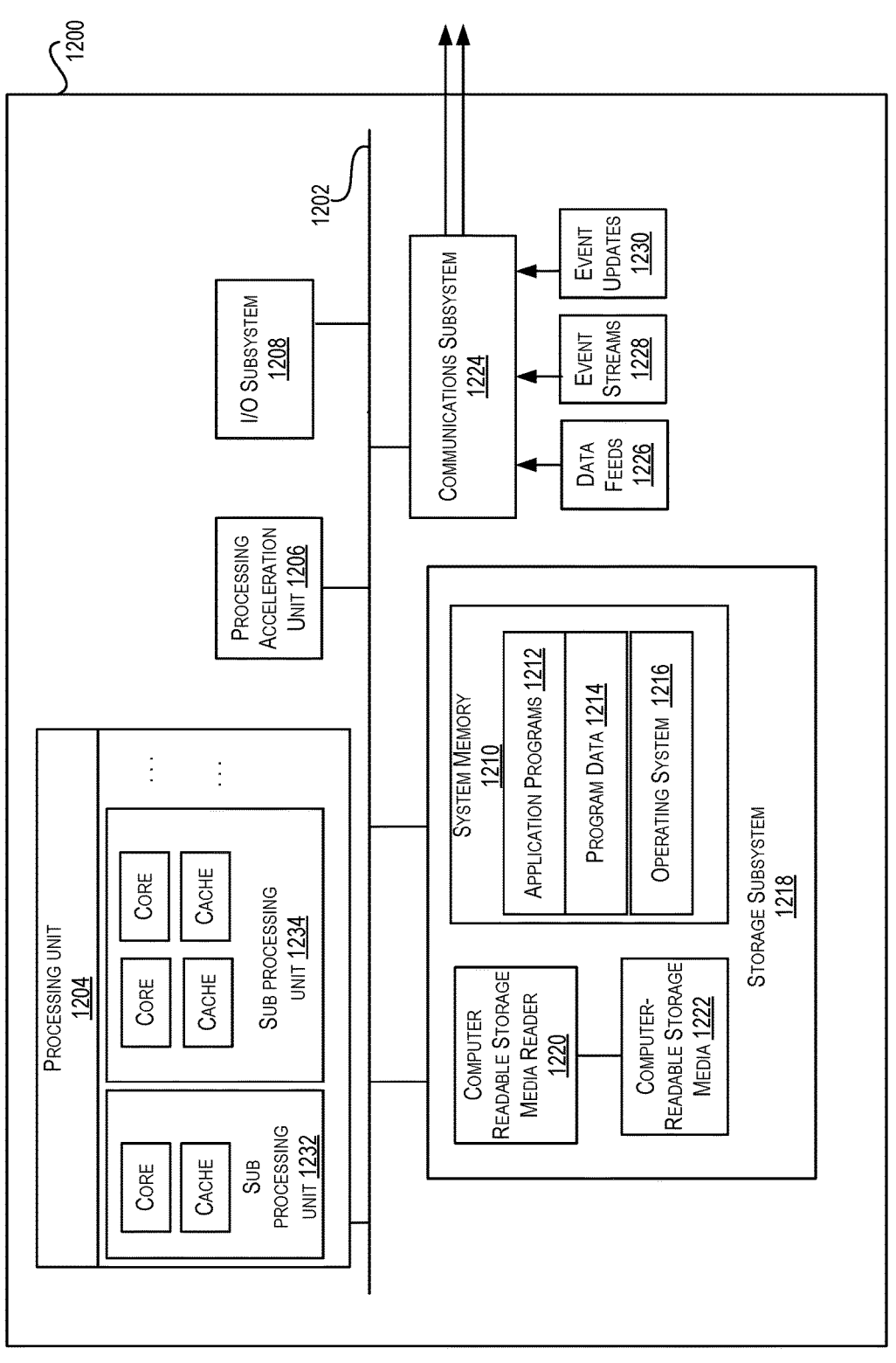
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
dividing, by an authentication service, authentication data into data stripes, the authentication data including at least one of:
group membership data;
dynamic group (DG) membership data; or
dynamic group identifier data;

storing, by the authentication service, the data stripes in databases, the databases being implemented on a fleet of machines, and the fleet of machines containing host machines;

updating, by the authentication service, the databases from data stripes via background computing threads where each database of the databases is updated by a separate background computing thread of the background computing threads;

receiving, by the authentication service, a first request to authenticate an entity, the first request comprising at least a user identifier that corresponds to requested authentication data;

identifying, by the authentication service, an identified host machine of the host machines of the fleet of machines, the identified host machine storing the requested authentication data;

retrieving, by the authentication service, the requested authentication data from the identified host machine;

storing, by the authentication service, the requested authentication data in a local cache of the identified host machine;

receiving, by the authentication service, a second request to authenticate the entity, the second request comprising at least the user identifier that corresponds to the requested authentication data;

identifying, by the authentication service, the identified host machine of the host machines of the fleet of machines using at least the user identifier;

retrieving, by the authentication service, the requested authentication data from the local cache of the identified host machine; and authenticating, by the authentication service, the entity in response to the second request using at least the requested authentication data.

2. The method of claim 1, wherein authenticating the entity in response to the first request comprises:

receiving, by the authentication service, the first request to authenticate the entity; and determining an authenticity of the entity based at least in part on the requested authentication data.

3. The method of claim 1, wherein the authentication data is data from at least one of a role based access control (RBAC) system or an attribute based access control (ABAC) system.

4. The method of claim 1, wherein dynamic group membership is determined by a set of matching rules.

5. The method of claim 1, wherein the authentication data from a single stripe of the data stripes is stored in a single host machine.

6. The method of claim 5, wherein the authentication data from the single stripe of the data stripes is stored in two or more databases within the single host machine.

7. The method of claim 1, wherein the host machines within the fleet of machines contain identical authentication data.

8. The method of claim 1, wherein the separate background computing thread corresponds to a particular data stripe of the data stripes.

9. A non-transitory computer-readable medium storing a set of instructions, the set of instructions comprising:

one or more instructions that, when executed by one or more processors of an authentication service, cause the authentication service to:

divide authentication data into data stripes, the authentication data including at least one of:

group membership data;

dynamic group (DG) membership data; or dynamic group identifier data;

store the data stripes in databases, the databases being implemented on a fleet of machines, and the fleet of machines containing host machines;

update the databases from the data stripes via background computing threads where each database of the databases is updated by a separate background computing thread of the background computing threads;

receive a first request to authenticate an entity, the first request comprising at least a user identifier that corresponds to requested authentication data;

identify an identified host machine of the host machines of the fleet of machines, the identified host machine storing the requested authentication data;

retrieve the requested authentication data from the identified host machine;

store the requested authentication data in a local cache of the identified host machine;

receive a second request to authenticate the entity, the second request comprising at least the user identifier that corresponds to the requested authentication data;

identify the identified host machine of the host machines of the fleet of machines using at least the user identifier;

retrieve the requested authentication data from the local cache of the identified host machine; and authenticate the entity in response to the second request using at least the requested authentication data.

10. The non-transitory computer-readable medium of claim 9, further comprising:

receiving, by the authentication service, the first request to authenticate the entity; and determining an authenticity of the entity based at least in part on the authentication data.

11. The non-transitory computer-readable medium of claim 9, wherein the authentication data is data from at least one of a role based access control (RBAC) system or an attribute based access control (ABAC) system.

12. The non-transitory computer-readable medium of claim 9, wherein dynamic group membership is determined by a set of matching rules.

13. The non-transitory computer-readable medium of claim 9, wherein the authentication data from a single stripe of the data stripes is stored in a single host machine.

14. The non-transitory computer-readable medium of claim 13, wherein the authentication data from the single stripe of the data stripes is stored in two or more databases within the single host machine.

15. The non-transitory computer-readable medium of claim 9, wherein the host machines within the fleet of machines contain identical authentication data.

16. An authentication service, comprising:

one or more memories; and one or more processors, communicatively coupled to the one or more memories, configured to:

divide authentication data into data stripes, the authentication data including at least one of:

group membership data;

dynamic group (DG) membership data; or dynamic group identifier data;

store the data stripes in databases, the databases being implemented on a fleet of machines, and the fleet of machines contain host machines;

update the databases from the data stripes via background computing threads where each database of the databases is updated by a separate background computing thread of the background computing threads;

receive a first request to authenticate an entity, the first request comprising at least a user identifier that corresponds to requested authentication data;

identify an identified host machine of the host machines of the fleet of machines, the identified host machine storing the requested authentication data;

retrieve the requested authentication data from the identified host machine;

store the requested authentication data in a local cache of the identified host machine;

receive a second request to authenticate the entity, the second request comprising at least the user identifier that corresponds to the requested authentication data;

identify the identified host machine of the host machines of the fleet of machines using at least the user identifier;

retrieve the requested authentication data from the local cache of the identified host machine; and authenticate the entity in response to the second request using at least the requested authentication data.

17. The authentication service of claim 16, further comprising:

receiving, by the authentication service, the first request to authenticate the entity; and determining an authenticity of the entity based at least in part on the authentication data.

18. The authentication service of claim 16, wherein the authentication data is data from at least one of a role based access control (RBAC) system or an attribute based access control (ABAC) system.

19. The authentication service of claim 16, wherein the authentication data from a single stripe of the data stripes is stored in a single host machine.

20. The authentication service of claim 19, wherein the authentication data from the single stripe of the data stripes is stored in two or more databases within the single host machine.

* * * * *